Dec. 17, 1968   L. BEAUJARD ETAL   3,416,366
VARIABLE SIZE ULTRASONIC BEAM PRODUCING TRANSDUCER
Filed Aug. 17, 1965   2 Sheets-Sheet 1

INVENTORS.
LOUIS BEAUJARD
JACQUES MONDOT
BY Kurt Kelman
Agent

United States Patent Office 3,416,366
Patented Dec. 17, 1968

3,416,366
VARIABLE SIZE ULTRASONIC BEAM PRODUCING TRANSDUCER
Louis Beaujard and Jacques Mondot, Saint Germain-en-Laye, France, assignors to Institut de Recherches de la Siderurgie Francaise, Saint Germain-en-Laye, France
Filed Aug. 17, 1965, Ser. No. 480,424
Claims priority, application France, Sept. 17, 1964, 988,418
6 Claims. (Cl. 73—71.5)

ABSTRACT OF THE DISCLOSURE

The beam of radiation in an ultrasonic testing device is widened or narrowed to suit the tested specimen by means of rubber shutters moved toward or away from each other across the beam between the radiation emitting transducer and the specimen. The shutters may be linked to the transducer so as to move toward each other when the transducer is moved toward the specimen and vice versa.

---

This invention relates to ultrasonic testing arrangements, and particularly to a transducer arrangement in an ultrasonic testing device.

It is conventional to emit a beam of ultrasonic radiation from an active surface of a transducer, and to direct the beam toward a specimen to be tested. A defect signal is derived from the interaction of the beam with the material of the specimen in a manner not directly relevant to this invention, and well known in itself.

The beam emitted from a given transducer in the known devices has fixed dimensions of width and depth, and is suitable only for testing specimens having similar dimensions. The range of dimensions of a specimen than can practically be tested with a given conventional transducer is quite narrow. When it is desired to test with the same testing device specimens whose dimensions vary greatly, it is necessary to employ several transducers respectively suited for the several specimen dimensions.

The changeover from one transducer to the other is time-consuming because it is necessary to adjust the apparatus to the newly inserted transducers. It is sometimes even necessary to change the transducer supporting structure.

It is the primary object of this invention to provide a transducer arrangement which permits specimens of widely varying dimensions to be tested with one and the same transducer, and thus to avoid the operations involved in changing transducers. The transducer may be fixedly mounted in the supporting structure in the testing devices of the invention.

It has been found that a transducer can be adapted to varying specimen dimensions by the provision of shutters which absorb the ultrasonic radiation and are moved transversely of the ultrasonic beam between the active transducer surface and the specimen tested, whereby the effective surface of the transducer may be reduced as needed. In order to prevent damage to the metallized active transducer surface, we provide the latter with a protective cover. The material of the latter is chosen to have an acoustical impedance which is intermediate the impedance of the transducer and that of the coupling medium which is interposed between the transducer surface and the opposite face of the specimen. The thickness of the protective cover should be substantially one half of the wavelength of the ultrasonic radiation.

When the active transducer surface is rectangular, two shutters that move in the direction of the longer sides of the surface toward and away from each other are preferred. Some applications may require two pairs of such shutters which move at right angles to each other so that the gap between the shutters, through which the beam may pass, may be varied from a narrow slit in the direction of transducer surface elongation to a narrow slit at right angles to the direction of elongation, and to a small square whose side is equal to the width of the aforementioned slits.

If the transducer surface is polygonal, it is preferred to provide as many shutters as there are sides to the polygon and to move them at right angles to the associated sides. When the surface is circular, the shutter or shutters may be annular. The combination of a single transducer with one or more sets of shutters thus permits the beam emitted to be closely adapted to the shape and dimensions of the tested specimen.

The fact that the ultrasonic beam may be narrowed in a very convenient manner makes it possible to localize a defect in a specimen with high precision. The specimen is first tested with the shutters widely spaced from each other to detect the presence of a defect without locating the same. Further investigation with a narrow beam then reveals the location of the defect. The reduction in transverse beam dimensions is limited, however, by the aperture angle of the beam which increases in an inverse relationship to the closing of the shutters. The dimensions of the impact area of the beam on the specimen pass through a minimum as the shutters are moved toward each other, and then increase again.

Other features and many of the attendant advantages of this invention will be readily apparent as the same becomes better understood by reference to the following detailed description of preferred embodiments when considered in connection with the accompanying drawing in which.

Figure 1:
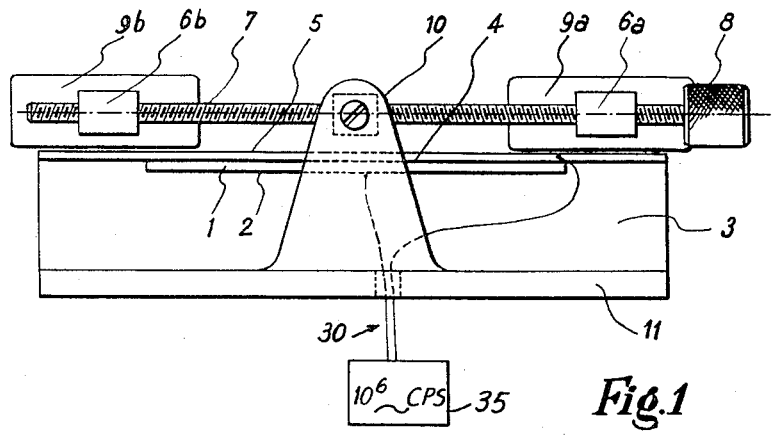
FIG. 1 shows a transducer arrangement of the invention in front elevation.
Figure 2:
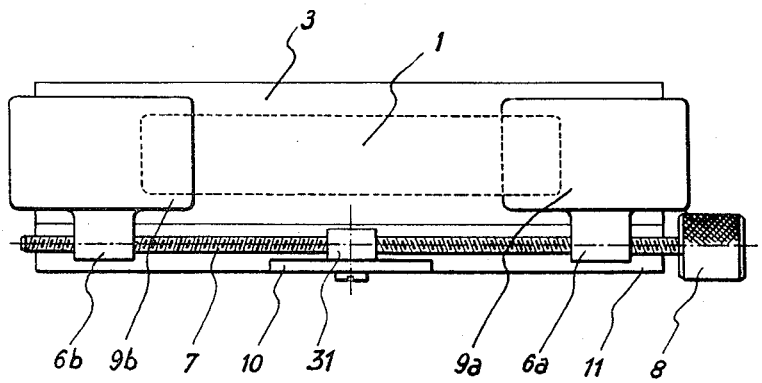
FIG. 2 shows the arrangement of FIG. 1 in plan view.

Referring initially to FIGS. 1 and 2, there is seen a piezoelectric plate-shaped transducer 1 of barium titanate whose two major rectangular faces 2, 4 are metallized in a conventional manner and connected to a generator 35 of alternating voltage at $10^6$ cycles per second by conductors 30. The transducer 1 is embedded in the top surface of a vibration damper 3 which in turn is mounted on a base plate 11.

A protective sheet 5 of plastic material covers the face 4 of the transducer 1 and the portion of the damper surface which is flush with the face 4 and surrounds the transducer 1. The acoustic impedance of the sheet material is intermediate that of the transducer material and that of water which is normally employed as a coupling fluid between the transducer 1 and the specimen to be investigated. The thickness of the sheet 5 is 0.024″ which is one half of the wavelength of the ultrasonic radiation in this plastic material. It will be understood that the entire transducer arrangement is normally operated while immersed in a tank filled with water at a sufficient distance from the water surface.

A bracket 10 mounted on the base plate 11 carries a bearing 31 in which the central portion of a spindle 7 is rotatably received and secured against axial movement in a conventional manner, not illustrated in detail. The two end portions of the spindle 7 respectively are provided with right-handed and left-handed threads which engage corresponding internal threads in integral bosses 6a, 6b on shutter members 9a, 9b which are identical blocks of rubber or other elastomeric material whose width is somewhat greater than that of the transducer face 4 with which they are vertically aligned. When a knob 8 on one end of the spindle 7 is turned, the shutter members 9a, 9b slide toward or away from each other on the exposed face of the protective sheet 5.

The illustrated apparatus produces a beam of ultrasonic radiation the width of which is readily adjusted by turning the knob 8, and may thus be adapted to the dimensions of an object to be tested which is exposed to beam. The specimen holding arrangement described hereinafter with reference to FIG. 3 is readily adapted in an obvious manner for use with the transducer arrangement illustrated in FIGS. 1 and 2 but the aforedescribed transducer arrangement is preferably employed for testing a specimen which is immersed in the coupling fluid, such as water.

Figure 3:
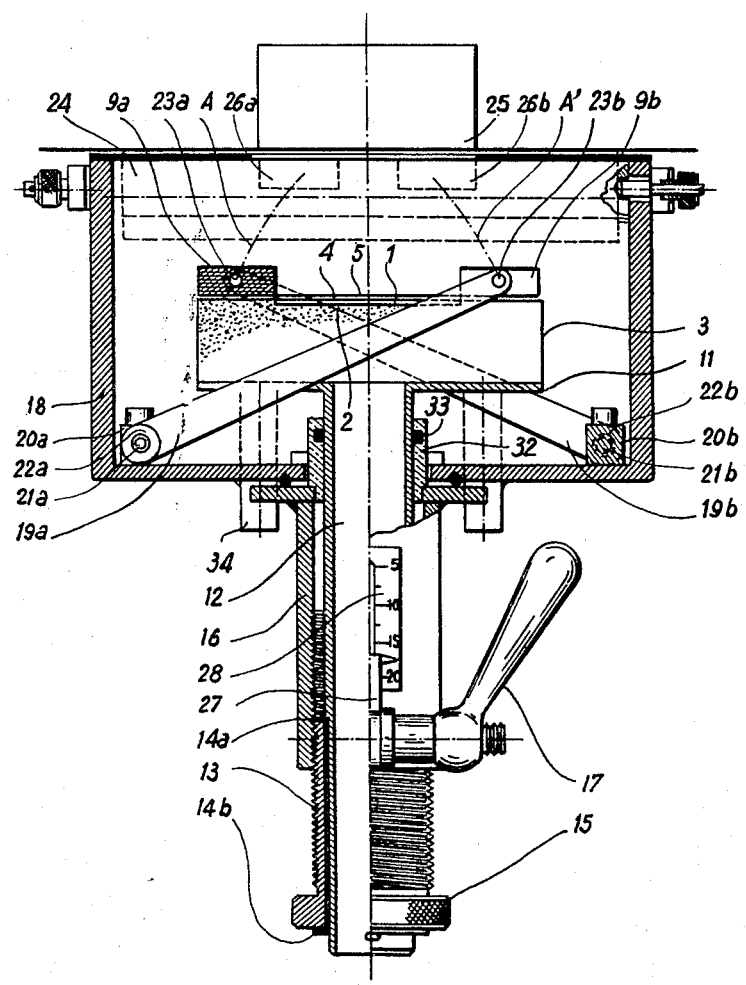
FIG. 3 illustrates another transducer arrangement in elevation, and partly in section.

The device illustrated in FIG. 3 includes an open stainless steel tank 18 equipped with two rollers 24 which are flush with the top of the tank, and of which only one is seen in the drawing. The tank is kept filled to the brim with water in a manner not further illustrated. A steel billet 25 may be moved across the open top of the tank 18 on the rollers 24 in contact with the water surface between the rollers 24.

An internally threaded pipe 16 vertically and axially aligned with the water surface is flanged to the bottom of the tank 18. An externally threaded stainless steel sleeve 13 engages the threads in the pipe 16, and threadedly moves in the pipe toward and away from the tank 18 when an integral knurled ring 15 on the free lower end of the sleeve 13 is turned.

The sleeve 13 is secured against axial displacement on a stainless steel tube 12 by two bronze rings 14a, and 14b but is freely rotatable on the tube. The sleeve 13 may be secured against axial displacement by a clamping arrangement 17 which permits the lower end of the pipe 16, which is axially slotted in a non-illustrated manner, to be tightened about the sleeve 13.

Axial movement of the tube 12 in an aperture of the tank 18 is guided by a nipple 32 which is sealed to the tube 12 by a gasket 33. The tube 12 carries the normally horizontal stainless steel base plate 11 of a transducer arrangement similar to that shown in FIGS. 1 and 2. Rotation of the plate 11 about the common axis of the tube 12 and the pipe 16 is prevented by guide bars 34 fixedly fastened to the tank bottom.

The base plate 11 carries a damper 3 in the top face of which a transducer 1 is embedded. A protective sheet 5 covers the transducer face 4 and adjacent face portions of the damper 3 to protect the transducer against abrasion by two shutter members 9a, 9b which are horizontally slidable on the sheet.

Coordinated sliding movement of the members 9a, 9b towards and away from each other is induced by two links 19a, 19b when the transducer assembly is moved vertically by rotation of ring 15. One end of each link 19a, 19b is hingedly attached to the tank 18 by a pivot pin 21a, 21b which is journaled in a pillow block 20a, 20b fixedly fastened to the tank bottom, and which is secured to the link by a cotter pin 22a, 22b. The other link ends are hinged respectively to the shutter members 9a, 9b by pivot pins 23a, 23b.

The shutter members 9a, 9b are thus guided by the links 19a, 19b in arcuate paths A, A' centered on the axes of the pivot pins 21a, 21b. The position of the apparatus illustrated in fully drawn lines is the lowermost position of the transducer assembly, and the position in which the shutter members 9a, 9b are farthest away from each other. When the tube 12 is raised by turning the knurled ring 15, the shutter members ultimately reach the other terminal positions 26a, 26b indicated in broken lines in which they are closest to each other and define a narrow aperture for passage of the ultrasonic beam from the transducer 1.

The vertical spacing of the shutter members 9a, 9b from the last mentioned terminal position is indicated by a pointer 27 extending from the ring 14a through the slot in the pipe 16, and by a scale 28 attached to the pipe 16. The indicating arrangement thus also indicates the depth of the coupling fluid interposed between the transducer 1 and the billet 25.

In operating the device shown in FIG. 3, the ring 15 is turned to adjust the gap between the shutter members 9a, 9b to the width of the billet that it is desired to test. In the illustrated position of greatest gap width, the entire ultrasonic beam produced at the active top face 4 of the transducer 1 is directed toward the bottom surface of the billet 25. If a smaller billet is to be tested, the ring 15 is turned so that the transducer assembly moves upward and the shutter members 9a, 9b move towards each other to narrow the gap and to absorb a portion of the ultrasonic beam.

The optimum thickness of the coupling fluid in the direction of propagation of the ultrasonic beam is a function of the thickness of the tested specimen in the same direction. When the specimen is steel, the spacing of the transducer from the specimen, which is identical with the thickness of the coupling liquid, should be at least one fourth of the corresponding dimension of the specimen. This condition is practically always met when the specimen and the transducer arrangement are both immersed in the coupling liquid, described with reference to the device shown in FIGS. 1 and 2. Such an arrangement is simple but it causes inherent losses of ultrasonic energy.

In the arrangement illustrated in FIG. 3, this condition is met by automatically varying the vertical thickness of the layer of coupling liquid as a function of the horizontal spacing of the shutter members 19a, 18b. Since the dimensions of the tested billet are always known, the position of the transducer can be selected in such a manner that the vertical thickness of the coupling liquid between the transducer and the tested specimen is at least equal to one quarter of the side of the billet.

The illustrated devices may be provided with two additional shutter members slidable on the members 9a, 9b at right angles to the direction of movement of the latter and provided with a separate actuating mechanism or linked to the shutter members 9a, 9b for coordinated movement therewith. Whereas the shutter members 9a, 9b only control the width of the ultrasonic beam whose depth remains constant, the supplemental pair of shutter members permits the depth of the beam to be varied either independently from, or jointly with, the width.

Other shutter arrangements, known in themselves from other applications may be adapted to the purposes of this invention. Shutter members shaped like the leaves of an iris diaphragm commonly employed in photographic cameras may be arranged to leave a central opening of approximately circular or oval shape, and their relative movements may be actuated by threaded control devices or by hinged links in the manner illustrated and described.

Devices embodying the features illustrated in the drawing have been successfully employed for the ultrasonic testing of billets varying in significant dimensions between 50 and 200 millimeters. The same transducer was employed regardless of the specimen dimensions, whereas the testing devices known heretofore required three to five different transducers for coping with a similar thickness range. Each change of transducer required a time-consuming and difficult adjustment of the apparatus. The single transducer of the invention needs to be adjusted but once.

Obviously many modifications and variations of the present invention are possible in the light of the above teachings. It is, therefore, to be understood that, within the scope of the appended claims, the invention may be practiced otherwise than as specifically disclosed.

What is claimed is:

1. A transducer arrangement for an ultrasonic testing device comprising, in combination:

(a) a transducer having an active surface;

(b) energizing means connected to said transducer for energizing emission of a beam of ultrasonic radiation from said surface in a direction transverse to said surface;
(c) two shutter members capable of absorbing said radiation;
(d) moving means for moving one of said shutter members in a path transverse of said direction of emission toward and away from the other shutter member while the shutter members are exposed to said beam; and
(e) a sheet member of protective material permeable to said radiation and covering said surface, said shutter members engaging said sheet member while moving in said path.

2. A transducer arrangement for an ultrasonic testing device comprising, in combination:
(a) a transducer having an active surface;
(b) energizing means connected to said transducer for energizing emission of a beam of ultrasonic radiation from said surface in a direction transverse to said surface;
(c) two shutter members capable of absorbing said radiation;
(d) moving means for moving one of said shutter members in a path transverse of said direction of emission toward and away from the other shutter member while the shutter members are exposed to said beam;
(e) a support; and
(f) means for moving said transducer relative to said support in said direction of transmission,
  (1) the moving means for moving said one shutter member including linkage means connected to said support and to said one shutter member for moving the latter in said path thereof in response to movement of the transducer in said direction of emission.

3. A transducer as set forth in claim 1, wherein said energizing means provides for emission of ultrasonic radiation of a fixed wavelength from said surface, the thickness of said sheet member being substantially equal to one half of the wavelength of said radiation in said sheet member.

4. An ultrasonic testing arrangement comprising, in combination:
(a) a transducer having an active surface;
(b) energizing means connected to said transducer for energizing emission of a beam of ultrasonic radiation from said surface in a direction transverse to said surface;
(c) two shutter members of a material impervious to said radiation;
(d) means for holding a specimen to be tested in a position spaced from said surface in the direction of said beam;
(e) a coupling liquid interposed between said specimen and said surface for passage of said beam through said liquid; and
(f) moving means for moving said shutter members through said liquid in a path transverse of said beam toward and away from each other.

5. An arrangement as set forth in claim 4, further comprising a sheet member of protective material permeable to said radiation and covering said surface, said shutter member engaging said sheet member while moving in said path.

6. An arrangement as set forth in claim 5, wherein the acoustic impedance of said protective material is intermediate the acoustic impedance of said transducer and the acoustic impedance of said coupling liquid.

References Cited

UNITED STATES PATENTS

| | | |
|---|---|---|
| 2,824,979 | 2/1958 | McKee. |
| 2,989,864 | 6/1961 | Bamford _____ 73—67.8 |
| 3,183,709 | 5/1965 | Rankin et al. _____ 73—67.5 |
| 2,448,352 | 8/1948 | Carlin _____ 73—71.5 X |

RICHARD C. QUEISSER, Primary Examiner.

JOHN P. BEAUCHAMP, JR., Assistant Examiner.

U.S. Cl. X.R.

73—67.8; 310—8.7